(12) United States Patent
Heiberg

(10) Patent No.: US 7,974,746 B2
(45) Date of Patent: Jul. 5, 2011

(54) SINGULARITY ESCAPE AND AVOIDANCE USING A VIRTUAL ARRAY ROTATION

(75) Inventor: Christopher J. Heiberg, Sunset Beach, CA (US)

(73) Assignee: The Boeing Company, Chicago, IL (US)

( * ) Notice: Subject to any disclaimer, the term of this patent is extended or adjusted under 35 U.S.C. 154(b) by 131 days.

(21) Appl. No.: 12/573,743

(22) Filed: Oct. 5, 2009

(65) Prior Publication Data

US 2010/0063653 A1    Mar. 11, 2010

Related U.S. Application Data

(62) Division of application No. 11/735,145, filed on Apr. 13, 2007, now Pat. No. 7,627,404.

(51) Int. Cl.
*B64G 1/28* (2006.01)
(52) U.S. Cl. .......................................... 701/13; 244/165
(58) Field of Classification Search ................... 244/164, 244/165; 701/13
See application file for complete search history.

(56) References Cited

U.S. PATENT DOCUMENTS

| | | | |
|---|---|---|---|
| 6,039,290 A | 3/2000 | Wie et al. | |
| 6,047,927 A | 4/2000 | Heiberg et al. | |
| 6,131,056 A | 10/2000 | Bailey et al. | |
| 6,154,691 A | 11/2000 | Bailey | |
| 6,241,194 B1 | 6/2001 | Heiberg | |
| 6,360,996 B1 * | 3/2002 | Bockman et al. | 244/165 |
| 6,682,019 B2 * | 1/2004 | Bailey | 244/164 |
| 6,917,862 B2 | 7/2005 | Wie | |
| 7,014,150 B2 | 3/2006 | Peck et al. | |
| 2006/0027708 A1 | 2/2006 | Peck et al. | |

OTHER PUBLICATIONS

Crenshaw, "2-Speed, A Single-Gimbal Control Moment Gyro Attitude Control System", Presented at the AIAA Guidance and Control Conf, Aug. 1973, 11 pages.
Dzielski et al, "Approach to Control Moment Gyroscope Steering Using Feedback Linearization", AIAA Journal of Guidance, Control and Dynamics, Jan.-Feb. 1991, vol. 14, No. 1, pp. 96-106.
Kennel, "Steering Law for Parallel Mounted Double-Gimbaled Control Moment Gyros-Revision A", NASA Technical Memorandum, Jan. 1981, 22 pgs.
Margulies et al., "Geometric Theory of Single-Gimbal Control Moment Gyro Systems", Journal of the Astronautical Sciences, vol. XXVI, No. 2, Apr.-Jun. 1978, pp. 159-191.
Nakamura et al, "Inverse Kinematic Solutions with Singularity Robustness for Robot Manipulator Control", Journal of Dynamic Systems, Measurements and Control, Sep. 1986, vol. 108, pp. 163-171.

(Continued)

*Primary Examiner* — Tien Dinh
(74) *Attorney, Agent, or Firm* — Caven & Aghevli LLC

(57) ABSTRACT

Techniques for providing singularity escape and avoidance are disclosed. In one embodiment, a method for providing control moment gyroscope (CMG) attitude control singularity escape includes calculating a Jacobian A of a set of control equations, calculating a measure of closeness to a singularity, and comparing the calculated closeness to a threshold value, when the calculated closeness is less than or equal to the threshold value, recalculating the Jacobian A. Recalculating may include determining a new direction of virtual misalignment of β and γ, recalculating the Jacobian inputting the new direction of the virtual misalignment, recalculating the measure of closeness to a singularity, and comparing the measure of closeness to the threshold value. Further, the method may include calculating a gimbal rate command if the of closeness is greater than the threshold value and generating a torque from the gimbal rate command to control the attitude of a satellite.

7 Claims, 3 Drawing Sheets

OTHER PUBLICATIONS

Schaub et al, "Feedback Control Law for Variable Speed Control Moment Gyros", Proceedings of 1998 AAS/AIAA Space Flight Mechanics Mtg, Feb. 1998, 21 pgs.

Vadali et al, "Preferred Gimbal Angles for Single Gimbal Control Moment Gyros", AIAA Journal of Guidance, Control and Dynamics, Nov.-Dec. 1990, vol. 13, No. 6, pp. 1090-1095.

Wie, "Singularity Escape/Avoidance Steering Logic for Control Moment Gyro Systems", AIAA Journal of Guidance, Control and Dynamics, Sep.-Oct. 2005, vol. 28, No. 5, pp. 948-956.

Wie et al, "Singularity Robust Control of Agile Spacecraft Using Single-Gimbal Control Moment Gyros", Proceedings of the AIAA Guidance, Navigation & Control Conf, Aug. 2000, 44 pgs.

* cited by examiner

SINGULARITY ESCAPE AND AVOIDANCE USING A VIRTUAL ARRAY ROTATION

RELATED APPLICATIONS

This application is a divisional of U.S. patent application Ser. No. 11/735,145 to Christopher J. Heiberg filed Apr. 13, 2007, the entire disclosure of which is incorporated herein by reference.

FIELD OF THE INVENTION

The invention relates to methods and systems for control moment gyroscopes (CMG) and more specifically to singularity escape and avoidance in CMG applications.

BACKGROUND OF THE INVENTION

A control moment gyroscope (CMG) maintains and adjusts the attitude of a satellite. A CMG usually consists of a spinning rotor and multiple motorized gimbals that tilt the rotor's angular momentum. When the rotor is displaced about a gimbal axis, the angular momentum changes and causes a gyroscopic torque that rotates the satellite.

Three or more CMGs are necessary for linear control of satellite attitude in three degrees of freedom. Two CMGs can be utilized as a scissor pair to provide control in a plane and, when utilized with another independent actuator(s), can steer a satellite in three axes. Regardless of the number of CMGs, gimbal motion may lead to relative orientations called singularities that produce no usable output torque along certain directions. When a satellite experiences a singularity, the satellite may lose control and stray from the objective orientation path.

A first class of singularity escape and avoidance methods tends to utilize an external actuator that is not part of the CMG array. The additional actuator augments the CMG array by adding more degrees of freedom and therefore singularities are avoided, or can be escaped. These methods tend to perform slowly and create other problems such as mission planning in the presence of an uncertain momentum envelope. A second class of singularity escape and avoidance methods uses mathematical augmentation or manipulation of the CMG array control law. These methods have drawbacks including having computationally intensive algorithms, not being deterministic, and creating torque disturbance.

Therefore, there exists a need for improved methods and systems for singularity escape and avoidance.

SUMMARY

Embodiments of methods and systems for providing singularity escape and avoidance and utilization of the momentum envelope beyond a singularity using a virtual array rotation are disclosed. Embodiments of methods and systems in accordance with the present disclosure may advantageously improve operation and reliability of structures equipped with CMGs for attitude control.

In one embodiment, a method for providing control moment gyroscope (CMG) attitude control singularity escape includes calculating a Jacobian A of a set of control equations, calculating a measure of closeness to a singularity, and comparing the calculated closeness to a threshold value, when the calculated closeness is less than or equal to the threshold value, recalculating the Jacobian A. Recalculating may include determining a new direction of virtual misalignment of $\beta$ and $\gamma$, recalculating the Jacobian inputting the new direction of the virtual misalignment, recalculating the measure of closeness to a singularity, and comparing the measure of closeness to the threshold value. Further, the method may include calculating a gimbal rate command if the of closeness is greater than the threshold value and generating a torque from the gimbal rate command to control the attitude of a satellite.

In another embodiment, a system for controlling the attitude of a satellite includes a plurality of control moment gyroscopes (CMG) in an array, and a controller for controlling the array of CMGs and providing singularity escape. The controller may further include a Jacobian calculation module to calculate a Jacobian matrix of a set of control equations, a determinant Jacobian module utilizing the Jacobian to produce a Jacobian determinant value that is a measure of closeness to a singularity, a comparison module for comparing the Jacobian determinant value to a threshold value, when the calculated determinant value is less than or equal to the threshold value, recalculating the Jacobian, when the calculate determinant value is greater than the threshold value, calculating a gimbal rate command, and a control module for transmitting the gimbal rate command to the plurality control moment gyroscopes to control the attitude of the satellite.

The features, functions, and advantages can be achieved independently in various embodiments of the present inventions or may be combined in yet other embodiments.

BRIEF DESCRIPTION OF THE DRAWINGS

Embodiments of the invention are described in detail below with reference to the following drawings.

DETAILED DESCRIPTION

Figure 1:
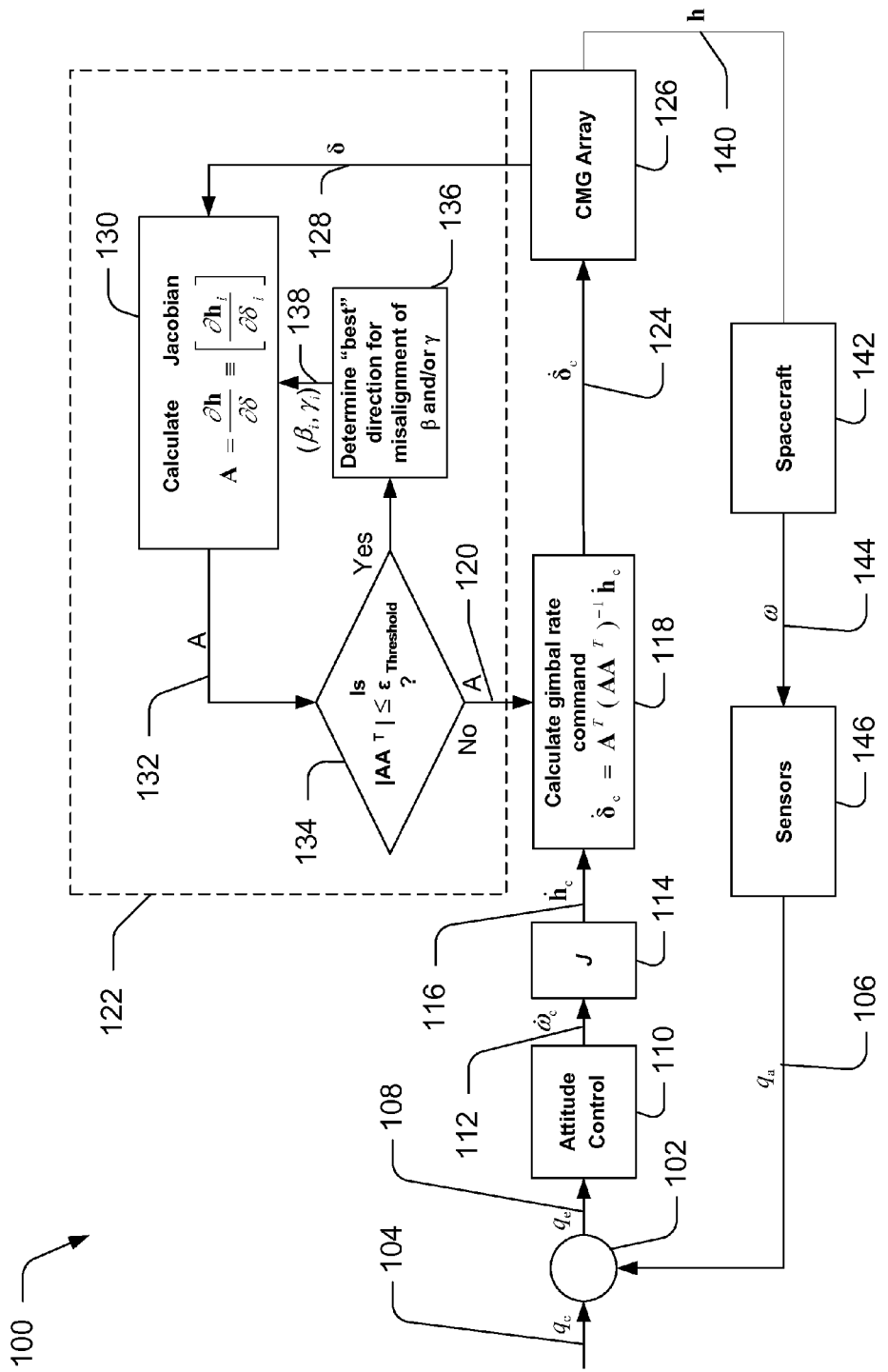
FIG. 1 is a block diagram of a control to rotate a satellite in response to a commanded rotation signal in accordance with an embodiment of the invention.

Methods and systems for providing singularity escape and avoidance and the utilization of the momentum envelope beyond a singularity using a virtual array rotation are described herein. Many specific details of certain embodiments of the invention are set forth in the following description and in FIGS. 1 through 3 to provide a thorough understanding of such embodiments. One skilled in the art, however, will understand that the present invention may have additional embodiments, or that the present invention may be practiced without several of the details described in the following description.

Embodiments of methods and systems in accordance with the present disclosure may advantageously provide a unique solution to the singularity avoidance/escape problem inherent in CMG applications. The solution includes producing a 'virtual' displacement of the CMG geometry such that the generated Jacobian (A) remains a non-singularity when used in an inverse or pseudo-inverse control law. To accomplish singularity avoidance, the CMG array is rotated to avoid the singularity. More specifically, the mathematics that describe the CMG array are rotated in a virtual space to find a mathematical solution that is not a singularity, yet generates torque in the approximate direction as commanded.

Introduction to CMG Systems and Methods:

To formulate an understanding of the teachings of the present disclosure, we begin with the underlying mathematical formulations involved in control moment gyroscope (CMG) systems and methods. A variation of the Robust Pseudo-Inverse (RPI) presented in U.S. Pat. No. 6,917,862 was presented by Wie, U.S. Pat. No. 6,917,862, for a unique case of a scissor-pair CMG arrangement originally proposed by Crenshaw (Crenshaw, "2—Speed, A Single-Gimbal Control Moment Gyro Attitude Control System", AIAA-73-895, Presented at the AIAA Guidance and Control Conference, Key Biscayne, Fla., Aug. 20-22, 1973). This particular implementation utilizes common parameters $\alpha$ and $\beta$, where $\alpha$ is the angle about which the CMGs scissor and $\beta$ is the half scissor angle between the two momentum vectors. In this implementation the Jacobian A is expressed in Equation 1 below.

$$A = 2 \begin{bmatrix} -\sin\alpha\cos\beta & -\cos\alpha\sin\beta \\ \cos\alpha\cos\beta & -\sin\alpha\sin\beta \end{bmatrix} \quad \text{Eq. 1}$$

By inspection, if both $\alpha$ and $\beta$ are zero (on a saturation singularity), the Jacobian A cannot be inverted and there is no solution to the equation. A time-varying RPI method generates a solution, but the resulting command is only directed to $\alpha$. The pair $\alpha$ and $\beta$ move in unison, and until perturbed, will remain on the saturation singularity. Wie's solution makes the W vector in the RPI method additionally time varying similar to what was proposed in Heiberg, U.S. Pat. No. 6,241,194.

When an implementation uses an array control approach utilizing two independent CMGs instead of a scissor-pair (i.e., do not use dependant parameters), the previously discussed time-varying RPI methods exhibit the same saturation singularity behavior. For example, given the array design approach by Heiberg and using $\beta=[0\ 0]$ (i.e., both CMG momentum vectors lie in a plane) and $\gamma=[0\ \pi]$, then Equation 2 depicts the Jacobian A as follows:

$$A = \begin{bmatrix} 0 & 0 \\ 1 & 1 \\ 0 & 0 \end{bmatrix} \quad \text{Eq. 2}$$

In the example provided by Wie, the torque command using the RPI method is expressed by Equation 3.

$$\dot{x} = A^{\#} \begin{bmatrix} -1 \\ 0 \\ 0 \end{bmatrix} \quad \text{Eq. 3}$$

$$= \begin{bmatrix} -0.0005 & 0.4762 & 0.0005 \\ -0.0005 & 0.4762 & 0.0005 \end{bmatrix} \begin{bmatrix} -1 \\ 0 \\ 0 \end{bmatrix}$$

$$= \begin{bmatrix} 0.0053 \\ 0.0053 \end{bmatrix}$$

The CMGs produce the same basic result whereas both CMGs are commanded in unison. However, the slightest misalignment of the gimbal axes, $\beta=[0\ 1.0°]$, $\gamma=[0\ \pi]$, as described in this disclosure advantageously cause the two CMG gimbal axes to have a distinct mapping while remaining substantially parallel. This creates a torque in the commanded direction, thereby allowing a satellite to safely exit the saturation singularity without any unnecessary or additional computations as expressed in Equation 4.

$$\dot{x} = A^{\#} \begin{bmatrix} -1 \\ 0 \\ 0 \end{bmatrix} \quad \text{Eq. 4}$$

$$= \begin{bmatrix} -0.0136 & 0.4770 & 0.0891 \\ -0.0039 & 0.4754 & 0.0869 \end{bmatrix} \begin{bmatrix} -1 \\ 0 \\ 0 \end{bmatrix}$$

$$= \begin{bmatrix} 0.0136 \\ -0.0039 \end{bmatrix}$$

The foregoing shows that by virtually altering the input geometry of one of the CMGs in the array by only one degree, the saturation singularity is escaped. This advantage is not achieved when utilizing the RPI method.

Problem to be Solved

This invention includes a process that avoids and escapes singularities in CMG arrays and allows the utilization of momentum from the CMGs beyond the singularity. The singularities are characterized by a drop in rank of a matrix. The singularities in a CMG control are not necessarily a physical realization of the array, but a computational problem analogous to a divide-by-zero problem in software code. Essentially an inversion of a matrix or equivalent is typically necessary in the control law, and may not always provide a solution due to zero Eigen-values (i.e., a drop in rank of that matrix). In order to properly discuss this problem, the following section describes the problem to be solved.

The control torque $\dot{h}$ (where h is the angular momentum) from a CMG array is given by the following equation, $$\dot{h} = A\dot{\delta} \quad \text{Eq. 5}$$

where $\dot{\delta}$ is the CMG gimbal rate, A is the CMG Jacobian which is a function of the individual gimbal angles $\delta_i$ as follows:

$$A = \frac{\partial h}{\partial \delta} \equiv \left[\frac{\partial h_i}{\partial \delta_i}\right] \equiv \left[\frac{\partial h_1}{\partial \delta_1}, \frac{\partial h_2}{\partial \delta_2}, \ldots, \frac{\partial h_n}{\partial \delta_n}\right] \quad \text{Eq. 6}$$

where $h_i$ is the momentum vector for the i-th of n CMGs and $\delta_i$ is the gimbal angle of the i-th CMG. The problem typically includes a 3-axis control, thus $h_i$ is 3-dimensional and A is a 3×n matrix. The two terms, $\beta$ and $\gamma$, are used in the calculation of the Jacobian as follows: the total CMG angular momentum vector h is obtained by first defining a set of unit normal vectors representing the gimbal axes with the gimbal angles set to zero as $$N(:,i) = \begin{bmatrix} \sin(\beta_i)\sin(\gamma_i) \\ -\sin(\beta_i)\cos(\gamma_i) \\ \cos(-\beta_i) \end{bmatrix} \quad \text{Eq. 7}$$

Where $i=(1,\ldots,n)$ CMGs. In addition, a corresponding matrix representing the reference gimbal angles is defined as in Equation 8.

$$Ref(:,i) = \begin{bmatrix} \cos(\gamma_i) \\ \sin(\gamma_i) \\ 0 \end{bmatrix} \quad \text{Eq. 8}$$

It should be noted that the selection of the sign convention and reference coordinates is deliberate because the configuration of an array can be specified by only two parameters, $\beta$ and $\gamma$. This approach yields N, Ref, and subsequent Quad matrices that can be verified intuitively for accuracy and require fewer overall calculations in simulation. The column-wise cross product of the N and Ref matrices yields the instantaneous momentum vector direction cosines for the four CMGs, which defines the Quad directions in Equation 9.

$$\text{Quad}=\text{cross}(N, \text{Ref}) \quad \text{Eq. 9}$$

The CMG momentum vectors h, may be calculated by a simple loop in software code as follows:
for i=1:4

$$h(i)=(\sin(\delta_i)*\text{Quad}(:,i)+\cos(\delta_i)*\text{Ref}(:,i)*h_0;$$

end.
The total CMG array momentum vector, h, is calculated by Equation 10.

$$h = \sum_{i=1}^{n} h_i \quad \text{Eq. 10}$$

Singular value decomposition of the m×n Jacobian yields insight into the behavior of the singularity problem. The Jacobian can be represented as $$A=U\Sigma V^T \quad \text{Eq. 11}$$

where U is the 3×3 orthonormal modal matrix of $AA^T$, often called the left singular vectors, V is the m×n orthonormal modal matrix of $A^TA$, called the right singular vectors and $\Sigma$ is a 3×n diagonal matrix. Given a 3-DOF control and 4 CMGs (n=4), A is 3×4 and $$\Sigma = \begin{bmatrix} \sigma_1 & 0 & 0 & 0 \\ 0 & \sigma_2 & 0 & 0 \\ 0 & 0 & \sigma_3 & 0 \end{bmatrix} \quad \text{Eq. 12}$$

where $\sigma_i$ are the singular values in descending order. Note that for n>m there are n-m zero columns in the $\Sigma$ matrix. Several properties exist for this decomposition, including the property of the singular values of A are the real, positive square roots of the Eigen values of $AA^T$ (and of $A^TA$). This may be utilized in a measure of closeness to a singularity.

A singularity is realized when trying to determine the CMG gimbal rate commands by an inversion technique. Typically, some form of Moore-Penrose pseudo-inverse or least squares method is employed, e.g., $$\dot{\delta}_c=A^T(AA^T)^{-1}\dot{h}_c \quad \text{Eq. 13}$$

where $\dot{h}_c$ is the commanded control torque and $\dot{\delta}_c$ is the gimbal rate command to the CMGs. When the pseudo-inverse is represented as:

$$A^+=A^T(AA^T)^{-1} \quad \text{Eq. 14}$$

then the singular value decomposition follows:

$$A^+=V\Sigma^+U^T \quad \text{Eq. 15}$$

thus the singular values take on the form (m=3, n=4) of Equation 16.

$$\Sigma^+ = \begin{bmatrix} \frac{1}{\sigma_1} & 0 & 0 \\ 0 & \frac{1}{\sigma_2} & 0 \\ 0 & 0 & \frac{1}{\sigma_3} \\ 0 & 0 & 0 \end{bmatrix} \quad \text{Eq. 16}$$

The mapping of the singular values to gimbal rate command follows in Equation 17.

$$\dot{\delta}_c=A^+\dot{h}_c=V\Sigma^+U^T\dot{h}_c \quad \text{Eq. 17}$$

When any of the singular values $\sigma_i$ go to zero, the processor is unable to determine a solution (i.e., a divide-by-zero occurs and infinite gimbal rates are commanded) and thus no valid command is created. Therefore, the satellite may be left uncontrolled until another valid command can be processed by it. Because the satellite tends to have a natural roll-off due to limitations of its control, the gimbal oscillates at its maximum bandwidth until enough gimbal drift has occurred to end the infinite gimbal rates resulting form the singularities. However, because the noise is often not very biased, the gimbal is naturally driven back into a singular state so only a detailed examination of the command history indicates the amount of time that the system is truly singular. The net result though is a complete loss of control to the satellite and thus safety measures must take over.

Exemplary Embodiment

FIG. 1 illustrates a block diagram 100 of a control to rotate a spacecraft (e.g., satellite or robot) in response to commanded rotation signal $q_c$ in accordance with an embodiment of the invention. It will be appreciated that FIG. 1 shows blocks that may be implemented through hardware or software, such as in a computer based satellite control containing one or more signal processors programmed to produce output signals to control CMGs on the spacecraft.

At a junction 102, a desired attitude $q_c$ 104 of the spacecraft is compared with an actual attitude $q_a$ 106 of the spacecraft. The attitude error $q_e$ 108 from the junction 102 is sent to an attitude controller 110 to produce a desired acceleration $\dot{\omega}_c$ 112 of the spacecraft. The desired acceleration 112 is multiplied by an inertia matrix J 114 to produce a torque command $\dot{h}_c$ 116. The inertia matrix 114 is expressed in Equation 18.

$$\dot{h}_c=J_s\dot{\omega}_c \quad \text{Eq. 18}$$

The torque command 116 is send to a gimbal rate command 118 along with an acceptable Jacobian A 120 from a routine 122 to calculate a CMG gimbal angle rate commands $\dot{\delta}_c$ 124. A CMG array 126 utilizes the CMG gimbal angle rate commands 124 to calculate gimbal angles $\delta$ 128. The gimbal angles 128 are then utilized at a Jacobian calculation 130, initially utilizing the values of $\beta_o$ and $\gamma_o$, to calculate a Jacobian A 132. The Jacobian A 132 is sent to a decision block 134 to determine if the threshold is surpassed. If the threshold is surpassed (i.e., the determinant of $AA^T$ is less than or equal to the threshold) at the decision block 134, a singularity may be encountered or is imminent, and thus the process moves along the 'yes' route to a block 136 to determine an acceptable direction to displace $\beta$ and/or $\gamma$ in order to affect the Jacobian A. The new values of $\beta$ and/or $\gamma$ 138 are sent to the Jacobian calculation 130 to provide singularity avoidance. At the decision block 134, the Jacobian A 132 is again evaluated against the threshold value. If necessary, the routine 122 is repeated to calculate a Jacobian 132 that exceeds the threshold when evaluated at the decision block 132. If the threshold is exceeded, a 'no' route advances to send the acceptable Jacobian A 120 to the gimbal rate command 118.

In embodiments, the values of β and/or γ 138 may be determined by a designer (e.g., engineer) among a range of acceptable values. Further, stochastic displacements may be used to generate values for β and/or γ 138. Therefore, an array displaced in a non-optimal direction will not be problematic to the disclosure as provided herein. Values of β and/or γ 138 may only need to make the calculation non-singular. In further embodiments, a designer may attempt to minimize the displacement and select a direction that would avoid encountering another singularity with each successive threshold evaluation.

Returning to the CMG array 126, the gimbal angle rate commands 124 operate the CMG array 126 which produce a torque $\dot{h}$ 140. The torque 140 acts on the spacecraft 142 to change its rate of rotation 144. The actual rate of rotation 144 of the spacecraft 142 is measured by sensors 146 which are used to determine the actual attitude 106 of the spacecraft 142.

Figure 2:
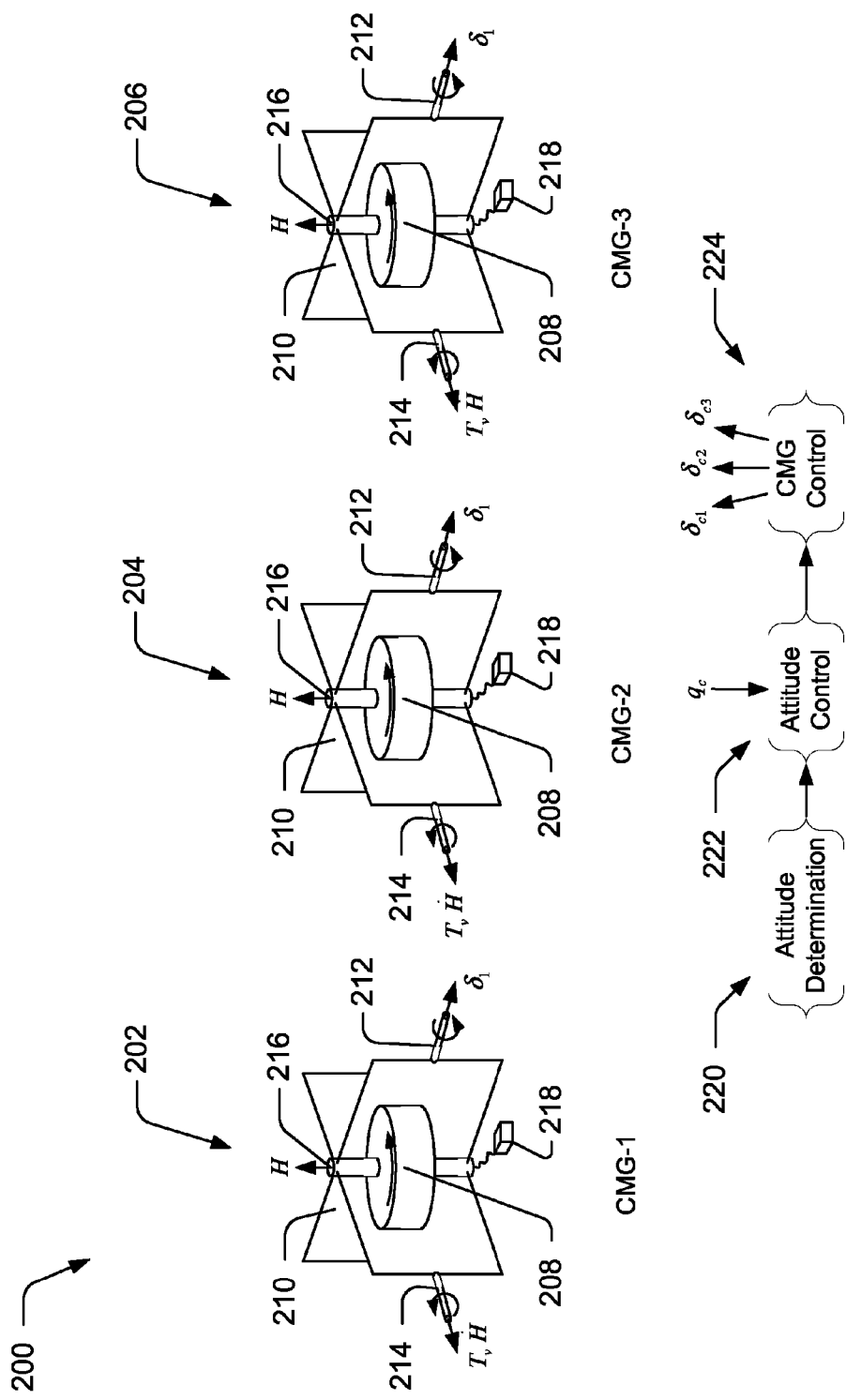
FIG. 2 is a schematic of a satellite with CMGs for changing the satellite attitude in response to angular rate signals in accordance with another embodiment of the invention.

FIG. 2 shows three CMGs (e.g., n=3) in environment 200. Each CMG 202, 204, 206 includes a rotor 208 configured within a rotor support 210. The first CMG 202 includes a gimbal axis $\dot{\delta}_1$ 212. The CMGs 202, 204, 206 also include a representation of the torque axis 214 that is always orthogonal to a rotor spin axis 216. The rotor spin axis 216 also represents the stored angular momentum of the CMG that, when rotated, generates a torque that lies in the direction axis 214. An electronic controller 218 is configured with each CMG 202, 204, 206. In other embodiments, support system of the CMG may be contained within successive gimbals similar to 212, all of which can be commanded similar to $\dot{\delta}_1$.

In operation of the CMGs in environment 200, the attitude is determined at block 220. Next, an attitude control is calculated at block 222 using the attitude from the block 220. The attitude control from the block 222 is used to calculate a CMG control at a block 224 to control the orientation or manage the vibration of the satellite.

Figure 3:
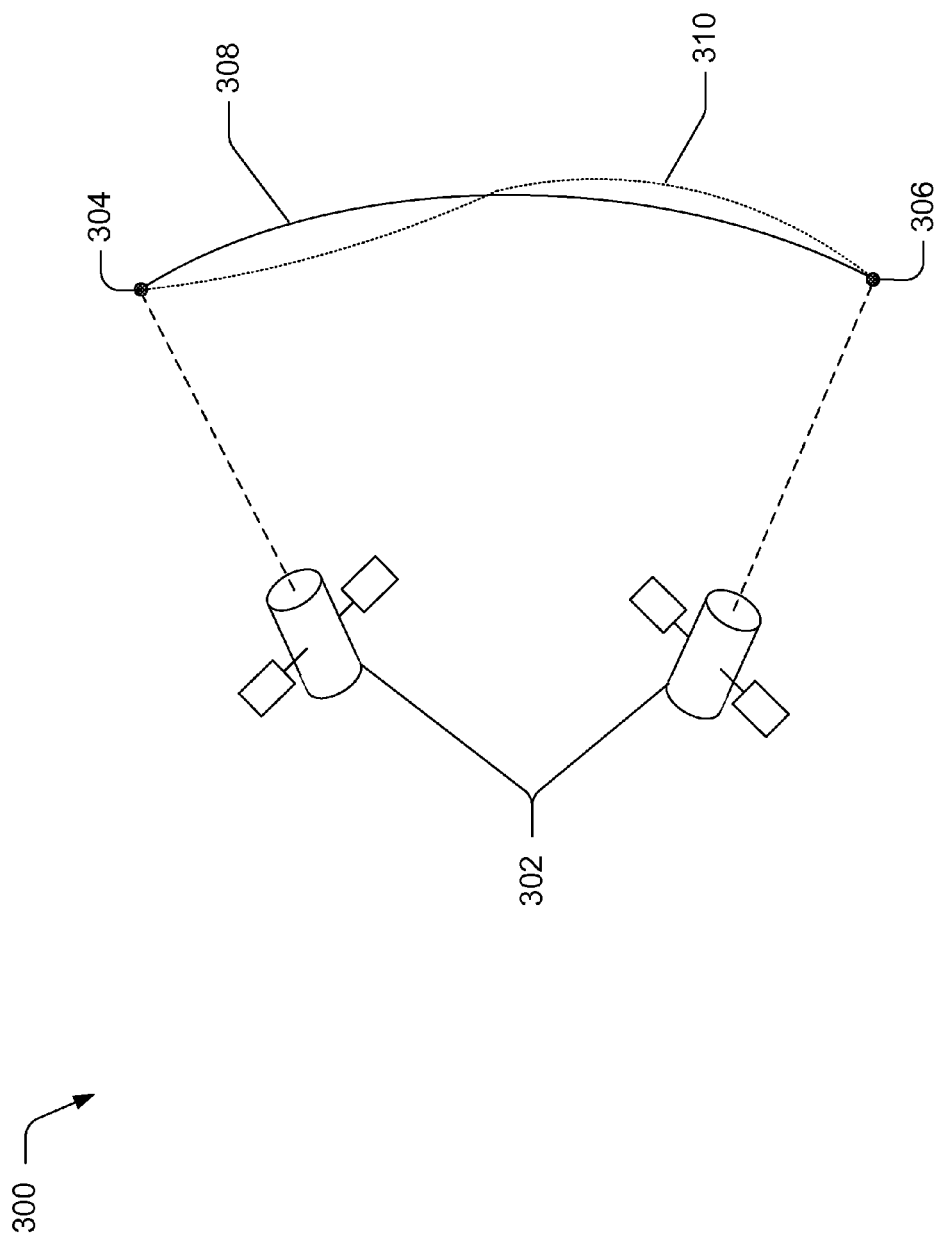
FIG. 3 is a schematic of a satellite path for reorientation of a satellite in accordance with yet another embodiment of the invention.

FIG. 3 illustrates a control scheme 300 (as shown in FIG. 1) to pan or rotate a satellite 302 on its axis from a line of sight view of a first object 304 to a line of sight view of a second object 306. A typical fully closed loop control follows an Eigen axis path 308 (e.g., the desired path) by controlling the CMG's based on the actual attitude 310. Although the process is shown for a single signal path between two points, but it should be understood that single lines represent vector data which is three dimensional for the satellite attitude, attitude rate and torques, and it dimensional for the signals related to the n CMGs.

Generally, any of the functions described herein can be implemented using software, firmware (e.g., fixed logic circuitry), hardware, manual processing, or any combination of these implementations. The terms "module," "functionality," and "logic" generally represent software, firmware, hardware, or any combination thereof. In the case of a software implementation, the module, functionality, or logic represents program code that performs specified tasks when executed on processor(s) (e.g., any of microprocessors, controllers, and the like). The program code can be stored in one or more computer readable memory devices. Further, the features and aspects described herein are platform-independent such that the techniques may be implemented on a variety of commercial computing platforms having a variety of processors.

Methods and systems for providing singularity escape and avoidance and utilization of the momentum envelope beyond a singularity using a virtual array rotation in accordance with the teachings of the present disclosure may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

CONCLUSION

Although the invention has been explained in the context of a spacecraft, it can be used in any system which can encounter singularities, such as satellite systems, robotic systems, or any other CMG-based or multi-actuator systems susceptible to singularities. While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A system for controlling the attitude of a satellite, comprising
   a plurality of control moment gyroscopes (CMG) in an array;
   a controller for controlling the array of CMGs and providing singularity escape, the controller further including:
      a Jacobian calculation module to calculate a Jacobian value of a set of CMG control equations;
      a determinant Jacobian Module utilizing the Jacobian matrix to produce a Jacobian Determinant value that is a measure of closeness to a singularity;
      a comparison module for comparing the Jacobian Determinant value to a threshold value, when the calculated determinant value is less than or equal to the threshold value, recalculating the Jacobian, when the calculated determinant value is greater than the threshold value, calculating a gimbal rate command; and
      a control module for transmitting the gimbal rate command to the plurality control moment gyroscopes to control the attitude of the satellite.

2. The system of claim 1, wherein the plurality of CMGs includes at least three CMGs.

3. The system of claim 2, wherein the Jacobian determinant value is the absolute value of the product of the Jacobian and the transverse of the Jacobian.

4. The system of claim 2, wherein the Jacobian is calculated with a virtual misalignment of inputs β and γ, wherein the virtual misalignment is updated for each iteration of the Jacobian calculation module.

5. The system of claim 4, wherein the determined new direction of the virtual misalignment is less than or equal to one degree for β and γ.

6. The system of claim 1, wherein a momentum envelope extends beyond the singularity.

7. The system of claim 1, further characterized in that: the gimbal rate command is $\dot{\delta}_c = A^T(AA^T)^{-1}\dot{h}_c$, where A is the Jacobian value and $\dot{h}_c$ is a torque command.

* * * * *